United States Patent [19]

Wise et al.

[11] 4,446,950

[45] May 8, 1984

[54] BRAKE CONTROL APPARATUS

[75] Inventors: Stanley S. Wise, Boynton Beach; Peter Maitland, Pompano Beach, both of Fla.

[73] Assignee: Fail Safe Industries, Inc., Lantana, Fla.

[21] Appl. No.: 327,171

[22] Filed: Dec. 3, 1981

[51] Int. Cl.³ .............................................. B60K 41/20
[52] U.S. Cl. ................................ 192/3 TR; 192/3 G; 192/4 A; 192/9; 180/287; 180/325; 188/181 A
[58] Field of Search .................... 192/1, 2, 3 R, 0.072, 192/3 TR, 3 G, 4 A, 9; 188/141, 151 A, 181 A, 181 C, 181 T; 180/173, 287, 325

[56] References Cited

U.S. PATENT DOCUMENTS

3,893,698  7/1975  Fontaine ............................. 303/89
4,289,219  9/1981  Csurgay et al. .................... 192/9 X
4,343,641  2/1982  Wise et al. ......................... 303/89 X
4,397,379  8/1983  Baudoin ......................... 192/0.076 X

Primary Examiner—George H. Krizmanich
Attorney, Agent, or Firm—Oltman and Flynn

[57] ABSTRACT

A creep control valve for keeping vehicle brakes applied is under the control of a digital electronic system which senses the vehicle speed and whether the accelerator pedal is depressed or released. The creep control is enabled only after the vehicle speed is between 3 and 24 miles per hour and then drops below 6 miles per hour with the accelerator pedal released. The creep control is disabled whenever the accelerator pedal is depressed or the vehicle speed is above 6 miles per hour or there is a failure of the speed resolver which senses the vehicle speed. The creep control includes a key-operated anti-theft circuit which keeps the brakes on if an incorrect key is inserted.

29 Claims, 4 Drawing Figures

BRAKE CONTROL APPARATUS

SUMMARY OF THE INVENTION

This invention relates to a brake control apparatus for a land vehicle, particularly a passenger car, to prevent the vehicle from creeping forward after being braked to a stop, such as at a traffic light.

Various brake control arrangements for this purpose have been disclosed heretofore, such as the one shown in U.S. Pat. No. 3,893,698 to John G. Fontaine.

The present invention is directed to a novel brake control apparatus which embodies a digital electronic system for controlling the operation of a creep control valve in the fluid pressure-operated braking system on a vehicle, particularly a hydraulic or pneumatic system. This digital control system senses the vehicle speed and other conditions and enables or disables the creep control accordingly. A failure of the speed sensor, which would indicate an apparent vehicle speed of zero, cannot activate the creep control when the vehicle may in fact be traveling at high speed. In addition to vehicle speed, the activation of the creep control depends upon whether or not the driver is depressing the accelerator pedal of the vehicle. Preferably, the activation of the creep control requires that the vehicle speed be sensed as being within a predetermined speed range, such as 3 to 24 miles per hour, and less than a preselected speed value within that range, such as 6 miles per hour.

Preferably, the digital control system incorporates an anti-theft circuit with a manually insertable key which must be the correct key to release the brakes when the vehicle is being started.

The digital control system also may have a manually operable disable switch which the driver may operate to disable the creep control, when desired.

A principal object of this invention is to provide a novel vehicle brake control apparatus having a digital electronic system for controlling the operation of a creep control valve.

Another object of this invention is to provide such a brake control apparatus which operates in response to a vehicle speed sensor but prevents the undesired application of the brakes if the speed sensor fails while the vehicle is in motion, especially at high speed.

Another object of this invention is to provide a novel brake control apparatus having a digital electronic system which includes anti-theft circuitry to keep the brakes on unless the correct key is inserted when starting the vehicle engine.

Further objects and advantages of this invention will appear from the following description and appended claims, reference being had to the accompanying drawings forming a part of this specification wherein like reference characters designate corresponding parts in the several views.

DETAILED DESCRIPTION

Figure 1:
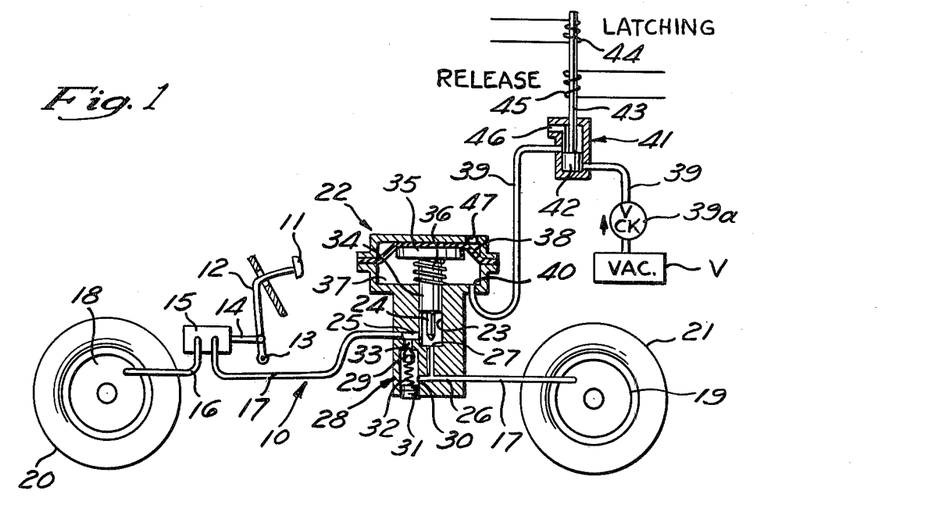
FIG. 1 is a schematic drawing showing an automatic braking system on a vehicle which may embody the present control apparatus.

FIG. 1 shows the hydraulic service brake system 10 of an automotive vehicle. This brake system includes the usual foot operated brake pedal 11 having an arm 12 pivoted at 13 and connected by a linkage 14 to the piston in a master brake cylinder 15. From the brake cylinder 15, conduits 16 and 17 lead to the service brakes 18 and 19 associated with the front and rear wheels 20 and 21 of the vehicle.

The brake control system may be arranged to control the front brakes 18, the rear brakes 19, or both front and rear brakes, if desired. In the illustrated embodiment, it controls the rear brakes 19, and it will be understood that there are rear brakes for both rear wheels of the vehicle.

The brake control system includes in conduit 17 an automatic two-way valve 22, which in this embodiment is vacuum operated. The particular valve 22 illustrated in the drawings has a bore 23 in which a needle valve element 24 can move reciprocably. The bore 23 has an inlet 25 connected through conduit 17 to the master cylinder 15, an outlet 26 connected through conduit 17 to the rear brakes 19, and an orifice 27 between the inlet 25 and the outlet 26. Hydraulic fluid can flow through the conduit 17 and the valve 22 in both directions when the valve is open. When the needle valve element 24 is seated against the orifice 27, the valve 22 is closed and it blocks flow of hydraulic fluid in the conduit 17. For example, if the service brake pedal 11 is depressed when the valve 22 is open, the brakes 18 and 19 will be applied. If the valve 22 then closes, the pressure previously applied to brakes 19 will not be released, and this keeps the brakes firmly applied to prevent the vehicle from creeping.

The brake control apparatus of this embodiment also includes a check valve 28 which is incorporated directly into the body of valve 22. It will be understood, however, that the check valve 28 could be provided as a separate unit. The check valve 28 is connected between the inlet 25 and the outlet 26 of the valve 22 so that increasing pressure at the inlet side of valve 22 can bypass valve 22 through the check valve 28 and be applied to the rear brakes 19. Consequently, when the valve 22 is closed, the brake pedal 11 can still be effective when depressed to apply increasing pressure to the rear brakes 19.

In the illustrated embodiment, the check valve 28 consists of a plunger 29 in a bore 30 that is closed by a plug 31. The plunger 29 is urged by compression spring 32 against an orifice 33 to keep that orifice normally closed. When pressure builds up in the orifice 33, the plunger 29 unseats from the orifice to allow fluid to flow through an outlet opening in bore 30, which communicates with the outlet 26. Hydraulic fluid is supplied to the check valve 28 through the inlet 25 which connects to the orifice passage 33. Thus, the check valve 28 bypasses the valve 22 and will allow fluid to flow around that valve in order to increase pressure on the rear brakes, but will not allow fluid to flow back through the reverse path when valve 22 is closed.

Valve 22 includes a plunger 34 attached to the needle valve element 24 having a head 35 on its upper end which is biased upward by a coil spring 36. The head 35 and the spring 36 are located in a chamber 37 which is divided into an upper half and a lower half by a flexible and resilient diaphragm 38. A conduit 39 is connected to the lower half of chamber 37 through an inlet 40. A vent passage 47 vents the upper half of chamber 37 to the atmosphere. Conduit 39 passes through a solenoid valve 41 to a vacuum source V which may be a tank located in the vehicle, or the vacuum manifold. A check valve 39a is connected in line 39 between solenoid valve 41 and vacuum source V.

Solenoid valve 41 includes a valve member 42 on a reciprocable plunger 43 which is raised from the position shown in FIG. 1 when a latching coil 44 is energized and is lowered to the FIG. 1 position when a release coil 45 is energized. In one practical embodiment, this solenoid valve is a Model 8322A1, 3-way solenoid valve sold by Automatic Switch Co., 50–56 Hanover Road, Florham Park, N.J., and described in that company's "ASCO Red-Hat" bulletin 8322.

As shown schematically in FIG. 1, when the release coil 45 is energized and valve member 42 is in its lowered position, it blocks the vacuum source V and vents the lower half of chamber 37 in valve 22 to the atmosphere via a vent opening 46 in solenoid valve 41. Consequently, the needle valve element 24 in valve 22 will be positioned as shown in FIG. 1.

When the latching coil 44 is energized, it moves the valve member 42 up to a position in which it blocks the vent opening 46 and provides fluid communication between the vacuum source V and the lower half of chamber 37 in valve 22. Consequently, the vacuum now applied below the diaphragm 38 moves the needle valve member 24 in valve 22 down to a position seated against the orifice 27.

Check valve 39a allows vacuum to be drawn toward the source V but does not allow flow in the opposite direction.

Figure 2:
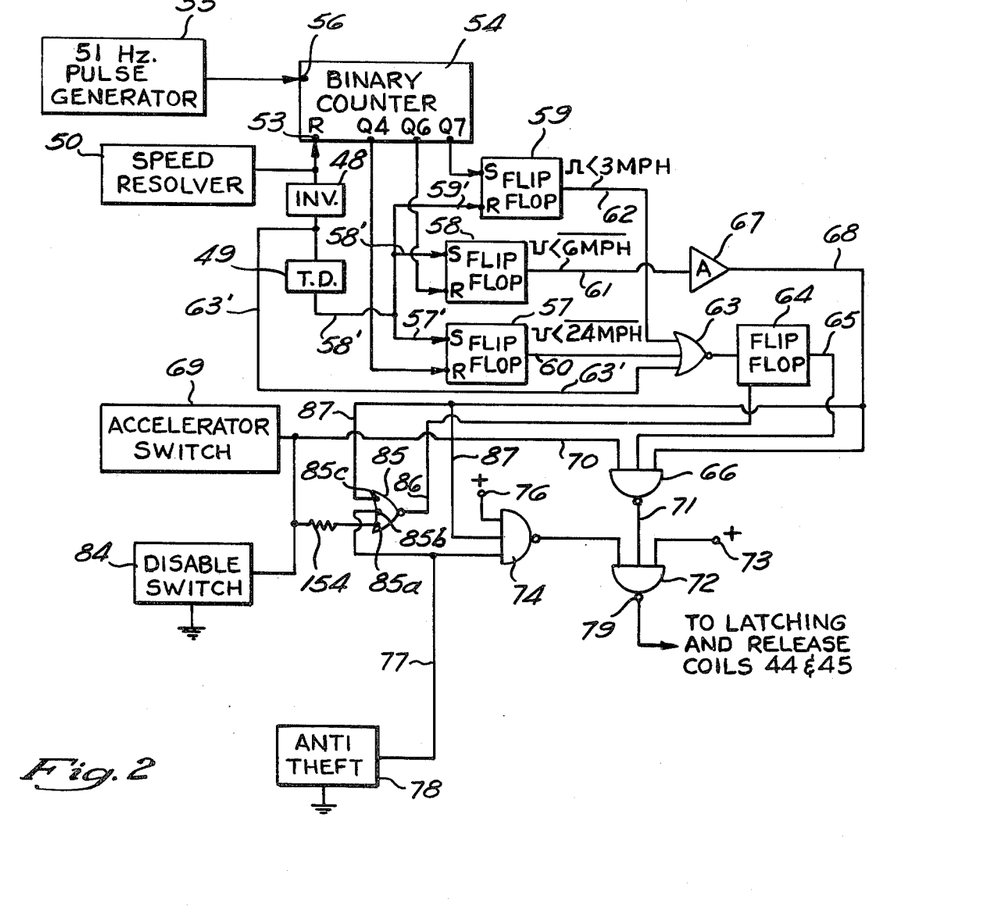
FIG. 2 is a schematic block diagram of the digital electronic system in the present brake control apparatus.

As shown schematically in FIG. 2, the latching coil 44 and the release coil 45 of solenoid valve 41 in FIG. 1 are under the control of a system which includes a speed resolver 50 including a sensor which senses the speed of the vehicle on which the brake system of FIG. 1 is installed. This speed sensor produces pulses at a frequency proportional to the ground speed of the vehicle. After amplification and shaping in the speed resolver, these vehicle speed pulses are applied to the reset terminal 53 of a binary counter 54. A pulse generator 55 operating at a frequency of 51 Hz. delivers pulses to the input terminal 56 of counter 54. With this arrangement, the number of 51 Hz. pulses which are counted by counter 54 before it is reset to a count of zero is inversely proportional to the vehicle speed, as represented by the pulses applied to the reset terminal 53 of the counter. That is, the faster the vehicle speed, the fewer will be the number of 51 Hz. pulses counted by counter 54 between successive resets to zero by the pulses originating at the vehicle speed resolver 50.

The counter 54 has its $2^4$ output terminal Q4 connected to the reset terminal of a flip-flop 57, its $2^6$ output terminal Q6 connected to the reset terminal of a flip-flop 58, and its $2^7$ output terminal Q7 connected to the set terminal of a flip-flop 59.

The speed resolver 50 has its output connected to an inverter 48 which has its output connected via line 63' to one input of NOR gate 63. The inverter output also is connected to the input of a time delay circuit 49, whose output is connected via line 57' to the set terminal of flip-flop 57, via line 58' to the set terminal of flip-flop 58, and via line 59' to the reset terminal of flip-flop 59.

When the vehicle speed is less than 24 miles per hour, each pulse from the Q4 output terminal of counter 54 resets flip-flip 57, which then produces a negative-going pulse on its output line 60. The next output pulse of speed resolver 50 is applied via inverter 48, time delay 49 and line 57' to the set terminal of flip-flop 57, and when this happens the output line 60 goes high again, terminating the negative-going pulse.

When the vehicle speed is less than 6 miles per hour, each pulse from the Q6 output terminal of counter 54 resets flip-flop 58, which then produces a negative-going output pulse on line 61. The next output pulse of speed resolver 50 sets flip-flop 58 via inverter 48 and time delay 49, and when this happens line 61 goes high again, terminating the negative-going pulse.

When the vehicle speed is less than 3 miles per hour, each pulse from the Q7 output terminal of counter 54 sets flip-flop 59, which then produces a positive-going pulse on line 62. The next output pulse of speed resolver 50 is applied via inverter 48, time delay 49 and line 59' to the reset terminal of flip-flop 59, and when this happens line 62 goes low again, terminating the positive-going pulse.

As already stated, NOR gate 63 has one input on line 63' from the output of inverter 48. A second input to this gate is through line 60 coming from the less-than-24 miles per hour flip-flop 57. A third input to NOR gate 63 is through line 62 coming from the less-than-3 miles per hour flip-flop 57.

If the vehicle speed is between 3 and 24 miles per hour, line 62 will be low and line 60 will be low momentarily in response to the resetting of flip-flop 57 by a pulse at the Q4 output of counter 54. The next output pulse from the speed resolver 50 will be applied through the inverter 48 substantially instantaneously as a low signal to the third input of NOR gate 63, which, with all three of its input low, produces a high at its output. After a time interval determined by the time delay circuit 49, this inverted output pulse from the speed resolver 50 sets flip-flop 57 again, causing its output to go high, which, in turn, causes the output of NOR gate 63 to go low.

However, before the output of NOR gate 63 goes low, its high output will have set the flip-flop 64, causing the latter to produce a high signal on its output line 65, which is connected to one input of a NAND gate 66. A second input to NAND gate 66 is on line 68, which is connected to the output of the less-than-6 mph flip-flop 58 through an inverting amplifier 67 so that line 68 is high if the vehicle speed is less than 6 mph. A third input to NAND gate 66 is on line 70, which is connected to a switch 69 controlled by the accelerator pedal of the vehicle. Line 70 is high unless the accelerator pedal is depressed, in which case it produces a low potential on line 70.

Accordingly, if the vehicle driver is not depressing the accelerator pedal and the vehicle speed is less than 6 mph and has previously been within the range from 3 to 24 mph, all three inputs to NAND gate 66 will be high and its output will be low.

The output terminal of NAND gate 66 is connected via line 71 to one input terminal of a NAND gate 72. A second input terminal of NAND gate 72 is connected to receive a positive voltage generated within the system. A third input terminal of NAND gate 72 is connected to the output of a NAND gate 74.

One input terminal of NAND gate 74 is connected via lines 87, 68, inverting amplifier 67 and line 61 to the output of the less-than-6 mph flip-flop 58. A second input terminal of NAND gate 74 is connected to receive a positive voltage generated within the system. A third input terminal of NAND gate 74 is connected by line 77 to an anti-theft circuit 78. Line 77 is low as long as the proper electronic key is in place in the anti-theft circuit.

Accordingly, when the vehicle speed is less than 6 mph, two inputs of NAND gate 74 will be high and a third input (from the anti-theft circuit 78) will be low. Consequently, the output from NAND gate 74 will be high.

Under these circumstances, NAND gate 72 has high inputs from terminal 73 and NAND gate 74 and a low input from NAND gate 66. The output from NAND gate 72 therefore is high, energizing the latching coil 44 of valve 41 (FIG. 1), as explained hereinafter. Release coil 45 of valve 41 will be de-energized when the output of NAND gate 72 is low.

With this arrangement, the latching coil 44 is energized to enable the creep control in response to the setting of flip-flop 64, which happens when the vehicle speed is sensed as being between 3 and 24 mph, followed by a pulse from the speed resolver 50. The setting of flip-flop 64, coupled with a high voltage on line 68 which indicates that the vehicle speed is below 6 mph, causes the NAND gate 66 to produce a low level on its output line 71, provided the accelerator pedal is not depressed, which would be the case if the vehicle driver wants to make the creep control effective. The NAND gate 72 produces a high level on its output terminal 79, energizing the latching coil 44 to enable the creep control.

The creep control is disabled through a NOR gate 85 when the vehicle speed increases above 6 mph after the driver has depressed the accelerator pedal.

NOR gate 85 has a first input terminal 85a connected to the accelerator switch 69 and to a manual switch 84 which is normally open but may be closed to disable the creep control. As shown at the lower left of FIG. 3A, one terminal of the accelerator switch 69 is connected through a resistor 152 to a +11 volt power supply terminal 153. The opposite terminal of switch 69 is connected through a resistor 154 to the input terminal 85a of NOR gate 85. The disable switch 84 is connected between resistor 154 and ground. A resistor 155 is connected in parallel with switch 84. When the vehicle driver depresses the accelerator pedal and opens switch 69, the first input terminal 85a of NOR gate 85 goes low.

Figure 3A:
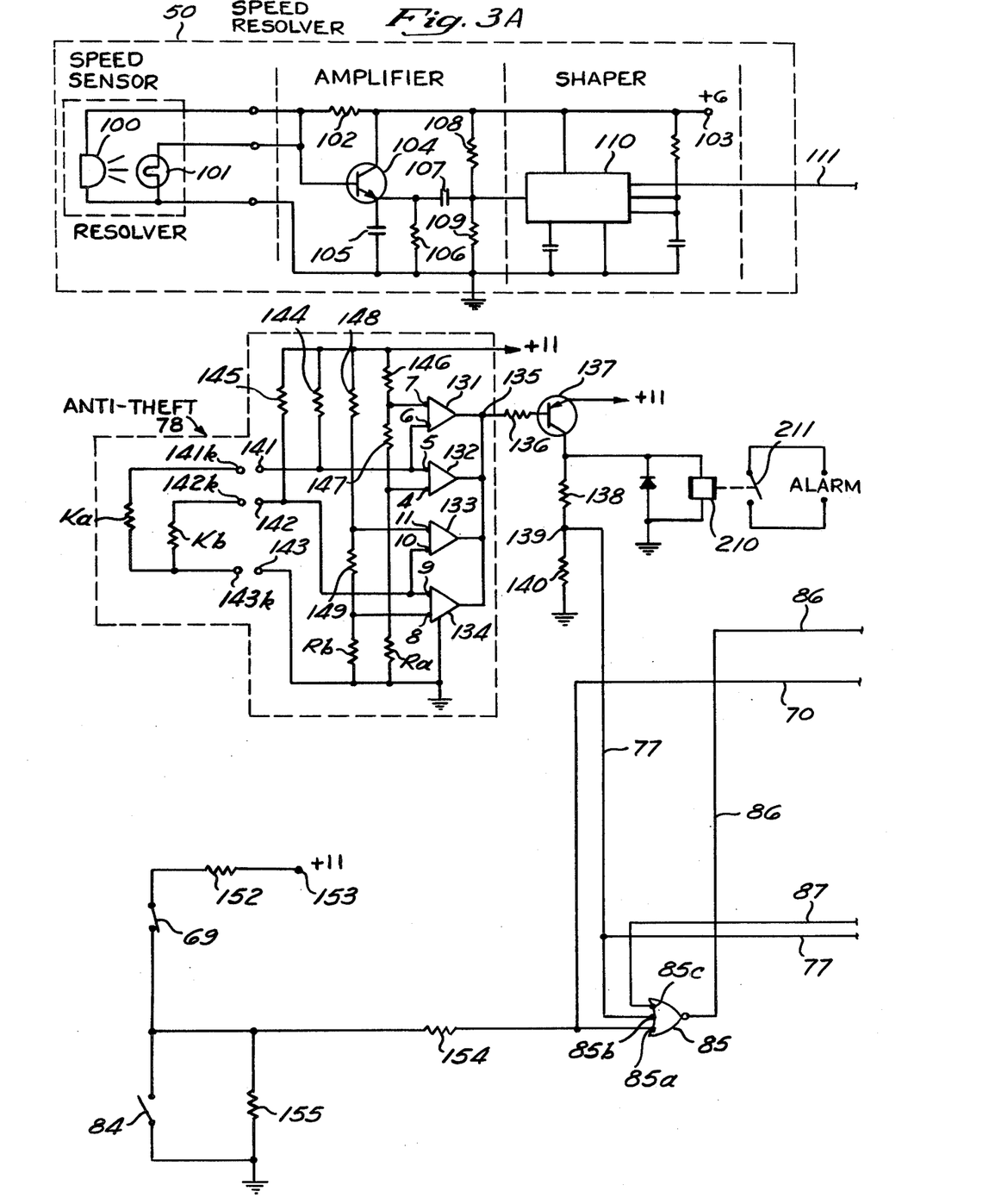
FIGS. 3A and 3B show different parts of this system in greater detail.

A second input terminal 85b to NOR gate 85 is connected to line 77 leading from an anti-theft circuit 78. When the proper electronic key is inserted in a socket connected in this anti-theft circuit, the signal on line 77 will be low.

A third input terminal 85c of NOR gate 85 is connected to the output of the less-than-6 mph flip-flop 58 through line 61, inverting amplifier 67, and lines 68 and 87. The signal on line 87 will be low if the vehicle speed exceeds 6 mph.

Accordingly, after the vehicle operator depresses the accelerator pedal to increase the speed and the vehicle speed passes 6 mph, all three inputs to NOR gate 85 will be low, causing its output to go high. This high signal is applied via line 86 to the reset terminal of flip-flop 64, resetting the latter and causing it to produce a low signal on its output line 65.

The input on line 70 to NAND gate 66 will have gone low upon the opening of the accelerator switch. The input on line 68 to NAND gate 66 will have gone low when the vehicle speed exceeded 6 mph. With the third input (on line 65) low upon the resetting of flip-flop 64, all three inputs to NAND gate 66 are low and therefore its output goes high.

Now all three inputs to NAND gate 72 are high so its output goes low, causing the release coil 45 of valve 41 to be energized, as explained in detail hereinafter. Consequently, valve member 42 in valve 41 moves to the position shown in FIG. 1, permitting normal braking operation and disabling the creep control.

As already mentioned, the creep control can be disabled and normal braking operation restored at any vehicle speed by closing the manual disable switch 84, which preferably is located on the dashboard of the vehicle. When switch 84 is closed, the input terminal 85a of NOR gate 85 will be low even if the accelerator switch 69 is in its normal closed condition. All three inputs to NOR gate 85 will be low and its output will be high, disabling the creep control, as described.

The circuit has a fail-safe operation in the event of a failure of the speed sensor 50 at a vehicle speed above 24 mph. Such a failure of the speed sensor will cause the speed-sensitive flip-flops 57, 58 and 59 to see an apparent zero vehicle speed. Consequently, a negative pulse will appear on line 60, a negative pulse will appear on line 61, and a positive pulse will appear on line 62. The output from NOR gate 63 will go low and the output line 65 of flip-flop 64 will go low. Line 68 will go high. Line 70 will be low if the accelerator pedal is depressed; it will be high if the accelerator pedal is released. Either way, the output of NAND gate 66 will be high, as will the output of NAND gate 74. Consequently, the output of NAND gate 72 will be low and the creep control will be disabled.

With this arrangement, the vehicle brakes cannot come on inadvertently at high speed in the event of a failure of the speed sensor. Instead, the circuit must first sense that the vehicle speed has dropped below 24 mph and above 3 mph, and after this it must sense that the vehicle speed has gone below 6 mph. Only after that sequence of events has occurred, in that order, can the creep control be enabled.

Figure 3B:
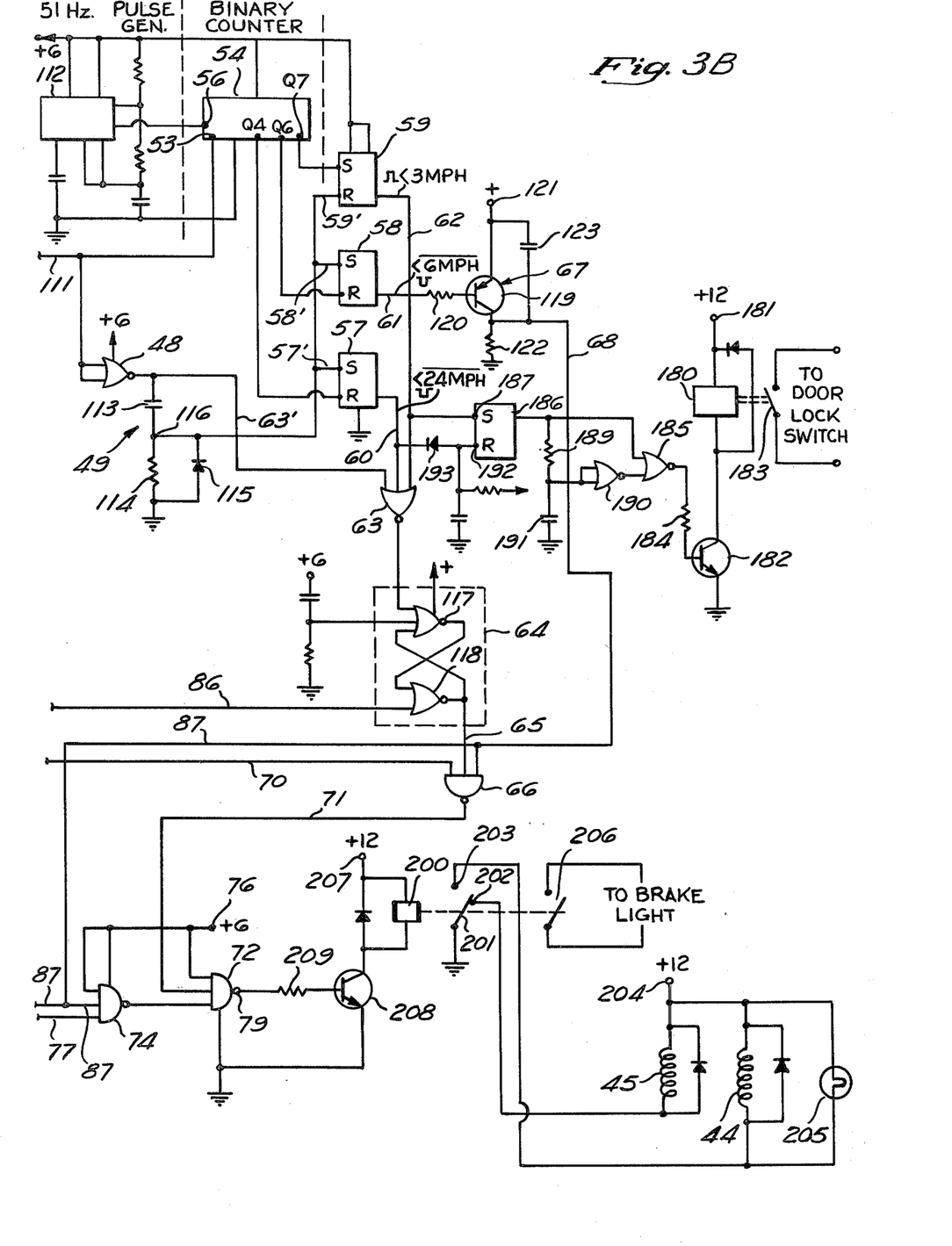

As shown at the lower right of FIG. 3B the separate energizations of the brake valve latching coil 44 and the brake valve release coil 45 are under the control of a relay having an operating coil 200 which, when energized, moves the grounded mobile relay contact 201 out of engagement with a first fixed contact 202 and into engagement with a second fixed contact 203. The release coil 45 is connected between a +12 volt terminal 204 and the normally-closed relay contacts 202 and 201, so that when the relay coil 200 is de-energized the release coil 45 will be energized. The brake valve latching coil 44 is connected between the same +12 volt terminal 204 and the normally-open relay contacts 203 and 201, so that when relay coil 200 is energized the brake latching coil 44 will be energized.

A brake indicator lamp 205 is connected across the latching coil 44 so as to be energized when the latching coil is energized, thereby indicating that the creep control is enabled.

Relay coil 200 also operates a second set of normally-open relay contacts 206 to complete an energization circuit for brake lights on the back of the vehicle.

The energization circuit for relay coil 200 includes a +12 volt terminal 207 and the collector-emitter path of a grounded-emitter transistor 208. The output terminal 79 of NAND gate 72 is connected through a resistor 209 to the base of transistor 208. When the output of NAND gate 72 is high, transistor 208 will be on and relay coil 200 will be energized, causing latching coil 44 to be energized. Conversely, when the output of NAND gate 72 is low, transistor 208 will be off and relay coil 200 will be de-energized, causing release coil 45 to be energized.

As shown in FIG. 3A, the anti-theft circuit 78, which controls the second input (at terminal 85b) to NOR gate 85, includes four voltage comparators 131, 132, 133 and 134 having their respective output terminals connected to a commonpoint 135, which is connected through a resistor 136 to the base of a transistor 137. The emitter of transistor 137 is connected to a +11 volt power supply terminal. Its collector is connected through a resistor 138 to line 77 leading to the second input terminal 85b of NOR gate 85. The junction point 139 between resistor 138 and line 77 is connected through a resistor 140 to ground.

When the potential at point 135 is low, transistor 137 will be on and the signal on line 77 leading to the second input 85b of NOR gate 85 will be high. Conversely, when the potential at point 135 is high, transistor 137 will be off and the signal on line 77 will be low.

The anti-theft circuit 78 has a socket with three terminals 141, 142 and 143 which are engageable by corresponding terminals 141k, 142k and 143k on a key carrying a first resistor Ka connected between its terminals 141k and 143k and a second resistor Kb connected between its terminals 142k and 143k. Socket terminal 141 is connected through a resistor 144 to a +11 volt power supply terminal. Socket terminal 142 is connected to this same power supply terminal through a resistor 145 of the same ohmic value as resistor 144. Socket terminal 143 is grounded.

Input terminal 6 of voltage comparator 131 and input terminal 5 of voltage comparator 132 are both connected directly to socket terminal 141, so that when the key is inserted in the socket the key resistor Ka will be connected between these comparator input terminals and ground. Input terminal 7 of voltage comparator 131 is connected to the +11 volt power supply terminal through a resistor 146. Input terminal 4 of voltage comparator 132 is connected to this power supply terminal through resistor 146 and another resistor 147 in series with it. A resistor Ra is connected between the input terminal 4 of voltage comparator 132 and ground.

Input terminal 10 of voltage comparator 133 and input terminal 9 of voltage comparator 134 are both connected directly to socket terminal 142, so that when the key is inserted in the socket the key resistor Kb will be connected between these comparator input terminals and ground. Input terminal 11 of voltage comparator 133 is connected through a resistor 148 to the +11 volt power supply terminal. Input terminal 8 of voltage comparator 134 is connected to this power supply terminal through resistor 148 and another resistor 149 in series with it. A resistor Rb is connected between input terminal 8 of voltage comparator 134 and ground.

If the resistors Ka and Kb on the key closely match the resistors Ra and Rb, respectively, the potential at the common output point 135 of the four voltage comparators 131-134 will be high; otherwise not.

When the key is inserted in the socket, the key resistor Ka and resistor 144 constitute a voltage divider which determines the voltage at input terminal 6 of voltage comparator 131 and at input terminal 5 of voltage comparator 132. This voltage, of course, depends upon the ohmic resistance value of key resistor Ka.

Resistor Ra and resistors 146 and 147 constitute voltage dividers which determine the voltages on input terminal 7 of voltage comparator 131 and input terminal 4 of voltage comparator 132.

The potential at the output terminal of voltage comparator 131 is low when the voltage at its input terminal 6 is higher than the voltage at its input terminal 7. The potential at the output terminal of voltage comparator 132 is low if the voltage at its input terminal 5 is less than the voltage at its input terminal 4. Either of these conditions can happen if the voltage at socket terminal 141 is within a narrow range, and it will be within that range only if the key resistor Ka matches resistor Ra.

Similarly, the potential on the output terminal of voltage comparator 133 is low when the voltage at its input terminal 10 is higher than the voltage at its other input terminal 11. The potential on the output terminal of voltage comparator 134 is low when the voltage at its input terminal 9 is less than the voltage at its input terminal 8. Either of these conditions can happen if the voltage at the socket terminal 142 is not within a narrow range, and it will be within that range only if the key resistor Kb matches resistor Rb.

The common point 135 will be low if any of the voltage comparators 131, 132, 133 and 134 produces a low output. In that event, transistor 137 will be on and the input on line 77 to NOR gate 85 will be high.

If the key has the correct resistors Ka and Kb, the outputs of all four voltage comparators 131-134 will be high and common point 135 will be high, turning off transistor 137 to produce a low on line 77.

In one practical embodiment, the elements of the anti-theft circuit 78 have the following values:
Ka, Ra, Kb, Rb—from 1,000 to 39,000 ohms
Resistors 144 and 145—11,000 ohms
Resistors 146 and 148—10,000 ohms
Resistors 147 and 149—2,200 ohms A relay coil 210 is connected in parallel with resistors 138 and 140 to be energized when transistor 137 is on. When this happens relay contacts 211 close to complete a circuit for energizing an audible or visible alarm device on the vehicle.

Referring to FIG. 3A, the speed resolver 50 includes a speed sensor, an amplifier and a pulse shaper.

The speed sensor may comprise a light emitting diode 100 or other light source and a photocell 101 positioned to sense light originating at the LED 100 and reflected from a sleeve on the speedometer cable on the vehicle, such that the photocell 101 is briefly energized once during each rotation of the speedometer cable. The lower terminals of the LED 100 and the photocell 101 in FIG. 3A are grounded. The upper terminals of LED 100 and photocell 101 in FIG. 3A are energized through a resistor 102 from a +6 volt terminal 103, which receives its energization from the vehicle battery (not shown) through a voltage regulator (also not shown).

The amplifier in the speed resolver includes a transistor 104 whose collector is connected to the +6 volt terminal 103. The base of this transistor is connected to the upper terminals of LED 100 and photocell 101. The emitter of transistor 104 is connected to ground through a parallel-connected capacitor 105 and resistor 106. The emitter of transistor 104 is connected through a capacitor 107 to the input of the pulse shaper. A resistor 108 is connected between the 6 volt terminal 103 and the output side of capacitor 107. A resistor 109 is connected between this side of capacitor 107 and ground.

The pulse shaper comprises a 556 integrated circuit 110 which receives amplified input pulses from the speed sensor and shapes them into square wave pulses that are applied to line 111.

Referring to FIG. 3B, line 111 coming from the pulse shaper section of the speed resolver 50 is connected to the reset terminal 53 of the binary counter 54. The 51 Hz. pulse generator 55 comprises a 556 integrated circuit 112 and associated resistors and capacitors. As already stated, the output from this pulse generator is applied to the input terminal 56 of the binary counter 54, which preferably is a 4024 integrated circuit. The counter 54 counts 51 Hz. pulses coming from the pulse generator 112 until it (the counter) is reset by the next speed resolver pulse coming in on line 111. Each successive speed resolver pulse resets counter 54 to zero.

Each of the previously-mentioned flip-flops 57, 58 and 59 preferably is a 4043 integrated circuit.

The inverter 48 preferably is a NOR gate having two inputs both connected to line 111 coming from the speed resolver 50.

The time delay circuit 49 comprises a capacitor 113 and a resistor 114 connected in series between the output of NOR gate 48 and ground, with a rectifier diode 115 connected across resistor 114 with the polarity shown. The junction point 116 between capacitor 113 and resistor 114 is connected to lines 57', 58' and 59'. This R-C circuit provides a suitable time delay between the end of a pulse at line 111 and the setting of flip-flop 57, the setting of flip-flop 58 and the resetting of flip-flop 59. This time delay insures that the NOR gate 63 will produce a high level output for a sufficiently long time interval, following the speed resolver pulse, to set flip-flop 64 as described.

The flip-flop 64 consists of two cross-connected NOR gates 117 and 118.

The inverting amplifier 67 connected to the output of the less-than-6 mph flip-flop 58 comprises a transistor 119 having its base connected through resistor 120 to the output line 61 from flip-flop 58, its emitter connected to a +6 volt terminal 121, and its collector connected to line 68 leading to one input of NAND gate 66 and, via line 87, to one input of NOR gate 85 (FIG. 3A). A resistor 122 is connected between the collector of transistor 119 and ground. A capacitor 123 is connected between the emitter and collector of transistor 119.

The present system has provision for automatically locking the vehicle doors whenever the vehicle speed exceeds 3 mph.

Referring to FIG. 3B, a relay coil 180 is connected between a +12 volt power supply terminal 181 and the collector-emitter path of a grounded emitter transistor 182. When energized, relay coil 180 closes its normally-open contacts 183, which are connected in a conventional circuit for controlling the door locks such that these locks are closed automatically in response to the closing of the relay contacts 183.

The base of transistor 182 is connected through a resistor 184 to the output terminal of a NOR gate 185. A flip-flop 186 has its set input terminal 187 connected directly to the output line 62 from the less-than-3 mph flip-flop 59, so that flip-flop 186 is set in response to the positive pulse which appears on line 62 when the vehicle speed is below 3 mph. The output of flip-flop 186 has one connection, via line 188, directly to one input terminal of NOR gate 185. The output of flip-flop 186 also is connected through a resistor 189 to both input terminals of a NOR gate 190 whose output is connected directly to a second input of NOR gate 185. A capacitor 191 is connected between the inputs to NOR gate 190 and ground. Resistor 189 and capacitor 191 constitute a time delay circuit for delaying the response of NOR gate 109 to a change of the signal level at the output of flip-flop 86

With this arrangement, when flip-flop 186 is set, line 188 is high but the output of NOR gate 190 is low, so the output of NOR gate 185 is low, keeping transistor 182 non-conducting. Consequently, the relay coil 180 is not energized when the vehicle speed is below 3 mph, as sensed by the less-than-3 mph flip-flop 59.

Flip-flop 186 has its reset terminal 192 connected through a rectifier diode 193 to the output line 60 from the less-than-24 mph flip-flop 57. When the vehicle speed is between 3 and 24 mph, the negative pulse on line 60 will be applied through diode 193 to the reset terminal 192 and will reset flip-flop 186, causing its output to go low. During the time delay interval provided by the R-C time delay circuit 189,189, both inputs to NOR gate 185 will be low, so its output will go high, turning on transistor 182 and energizing relay coil 180 long enough to close the door locks. At the end of this time delay interval, the output of NOR gate 190 will go high, causing the output of NOR gate 185 to go low, which turns off transistor 182 and de-energizes the relay coil 180.

With this arrangement, when the driver is accelerating the vehicle from a stop or from a speed below 3 mph, as soon as the speed exceeds 24 mph, the relay coil 180 will be energized for a brief interval long enough to close the door locks, after which the relay coil will be de-energized again.

OPERATION

In starting the car engine, if no key or an incorrect key is inserted in the socket of the anti-theft circuit 78, the brakes cannot be released. Under either of these conditions, line 77 will be at a high potential as will line 87 because there is no output from the speed resolver 50. With all three of its inputs positive, NAND gate 74 produces a low output signal which is applied to one input terminal of NAND gate 72. A second input terminal (on line 71) to NAND gate 72 is high, and the third input (at 73) is high. The output of NAND gate 72 is high, turning on transistor 208 and energizing relay coil 200 to close relay contacts 202 for energizing the latching coil 44. Consequently, valve 22 will be held closed and the fluid pressure on the rear brakes 19 will not be released. (This fluid pressure would have been applied by the application of the brakes and the actuation of the creep control the last time the car was stopped and the engine turned off. Thus, the anti-theft circuit merely maintains the status quo, preventing the already-applied creep control from being released).

However, if the correct key is inserted in the anti-theft circuit, line 77 will be low and the output of NAND gate 74 will be high. With all three of its inputs, now high, NAND gate 79 produces a low output signal which turns off transistor 208, deenergizing relay coil 200. This causes the release coil 45 to be energized, opening valve 22 to release the creep control.

Assuming that the correct key has been inserted, and the creep control released, as described, the depressing of the accelerator pedal keeps switch 69 open, maintaining a low potential on line 70. This keeps the output from NAND gate 66 high to keep the release coil 45 energized and the latching coil 44 de-energized. When the vehicle speed exceeds 6 miles per hour, a high signal on line 86 (resulting from all three inputs to NOR gate 85 now being low) resets flip-flop 64.

Any time the accelerator pedal is released, causing switch 69 to close, whenever the vehicle speed is within the speed range 3 to 24 miles per hour, flip-flop 64 will be set, producing a high signal on line 65. Then when the vehicle speed is below 6 miles per hour, the signal on line 68 will be high. The third input, on line 70, to NAND gate 66 will be high because the accelerator switch 69 is closed. With all three of its inputs high, NAND gate 66 produces a low output signal on line 71. This causes the output of NAND gate 72 to go high, energizing the latching coil 44 and de-energizing the release coil 45, so that the creep control now is enabled. The creep control will stay enabled after the vehicle has been brought to a stop and until the accelerator pedal is depressed and the vehicle speed again exceeds 6 miles per hour.

As already described, a failure of the speed resolver will not cause the creep control to be enabled but only normal braking operation can occur under those circumstances.

Various modifications may be made without departing from the present invention. For example, the valves 22 and 41 in the braking system of FIG. 1 might be replaced by a solenoid valve of known design. Also, the vehicle speed sensor 100, 101 could differ from the particular arrangement described and it could be operated by something other than the speedometer cable. Also, the present apparatus may be used on an automotive vehicle with a stick shift, in which case a clutch pedal switch could be connected in parallel with the accelerator pedal switch 69, so that depressing either of these pedals would produce the same effect.

The invention applies to air brakes or any fluid operated brakes, including hydraulic brakes.

We claim:

1. In a brake control apparatus on a motor vehicle having an accelerator pedal, a brake pedal and fluid pressure-operated brakes which are applied by fluid pressure in a conduit responsive to depression of the brake pedal, said apparatus having:
   valve means in said conduit for controlling the fluid pressure applied to the brakes;
   electrical control means for closing said valve means to keep fluid pressure applied to the brakes after the brake pedal has been depressed;
   and means for opening said valve means when said electrical control means is de-energized;
the improvement which comprises:
   digital signal generator means operable to produce digital signals varying with the vehicle speed;
   and means operatively connected to the output of said digital signal generator means for energizing said electrical control means to close said two-way valve means when
   (a) the vehicle operator releases the accelerator pedal, and
   (b) the vehicle speed decreases to within a predetermined speed range and thereafter drops below a preselected intermediate speed within said range.

2. A brake control apparatus according to claim 1, wherein:
   said predetermined speed range is from about 24 miles per hour to 3 miles per hour;
   and said preselected intermediate speed is about 6 miles per hour.

3. A brake control apparatus according to claim 1, wherein:
   said digital signal generator means comprises a speed resolver for producing signals whose frequency varies with the vehicle speed;
   and said means operatively connected to the output of said signal generator means de-energizes said electrical control means in response to cessation of signals from said speed resolver upon failure of said speed resolver.

4. A brake control apparatus according to claim 3, wherein said means operatively connected to the output of said signal generator means includes a flip-flop operative
   (1) to produce a first binary signal when the accelerator pedal is released and (a) the vehicle speed is within said predetermined speed range or (b) the vehicle speed drops from said range into a speed below the lower limit of said range, and
   (2) to produce the opposite binary signal when (c) the accelerator pedal is depressed and the vehicle speed is above said preselected intermediate speed or (d) the vehicle speed is above said predetermined range or (e) said speed resolver stops producing signals.

5. A brake control apparatus according to claim 1, wherein said digital signal generator means comprises:
   a speed resolver operative to produce pulses whose frequency varies with the vehicle speed;
   a fixed frequency pulse generator;
   and a binary counter operatively coupled to said speed resolver and said fixed frequency pulse generator to count the pulses from said speed resolver between successive pulses from said fixed frequency pulse generator.

6. A brake control apparatus according to claim 1, and further comprising:
   an anti-theft circuit, including a manually insertable key, operatively coupled to said electrical control means to energize the latter when an incorrect key is in said anti-theft circuit while the vehicle is stopped.

7. A brake control apparatus according to claim 6, and further comprising:
   binary logic circuit means having a first input operatively connected to said anti-theft circuit and a second input operatively connected to the output of said digital signal generator means for energizing said electrical control means when the vehicle is stopped and an incorrect key is in said anti-theft circuit.

8. In a brake control apparatus on a motor vehicle having an accelerator pedal, a brake pedal and fluid pressure-operated brakes which are applied by fluid pressure in a conduit responsive to depression of the brake pedal, said apparatus having:
   valve means in said conduit for controlling the fluid pressure applied to the brakes;
   electrical control means for closing said valve means to keep fluid pressure applied to the brakes after the brake pedal has been depressed;
   means for opening said valve means when said electrical control means is de-energized;
   digital signal generator means comprising a speed resolver operable to produce digital signals whose frequency varies with the vehicle speed;

and means operatively connected to the output of said digital signal generator means for energizing said electrical control means to close said two-way valve means when (a) the vehicle operator releases the accelerator pedal, and (b) the vehicle speed decreases to within a predetermined speed range and thereafter drops below a preselected intermediate speed within said range;

said means operatively connected to the output of said signal generator means de-energizing said electrical control means in response to cessation of signals from said speed resolver upon failure of said speed resolver;

said means operatively connected to the output of said signal generator means including a flip-flop operative (1) to produce a first binary signal when the accelerator pedal is released and (a) the vehicle speed is within said predetermined speed range or (b) the vehicle speed drops from said range into a speed below the lower limit of said range, and (2) to produce the opposite binary signal when (c) the accelerator pedal is depressed and the vehicle speed is above said preselected intermediate speed or (d) the vehicle speed is above said predetermined range or (e) said speed resolver stops producing signals;

said means operatively connected to the output of said signal generator means further comprising:

logic circuit means having a binary output and having a first input operatively connected to the output of said flip-flop, a second input operatively connected to said signal generator means to receive a binary signal therefrom which depends upon whether the vehicle speed is above or below said preselected intermediate speed, and a third input operatively connected to said accelerator pedal to receive a binary signal which depends upon whether the accelerator pedal is released or depressed.

9. In a brake control apparatus on a motor vehicle having an accelerator pedal, a brake pedal and fluid pressure-operated brakes which are applied by fluid pressure in a conduit responsive to depression of the brake pedal, said apparatus having:

valve means in said conduit for controlling the fluid pressure applied to the brakes;

electrical control means for closing said valve means to keep fluid pressure applied to the brakes after the brake pedal has been depressed;

means for opening said valve means when said electrical control means is de-energized;

digital signal generator means operable to produce digital signals varying with the vehicle speed;

and means operatively connected to the output of said digital signal generator means for energizing said electrical control means to close said two-way valve means when (a) the vehicle operator releases the accelerator pedal, and (b) the vehicle speed decreases to within a predetermined speed range and thereafter drops below a preselected intermediate speed within said range;

said digital signal generator means comprising:

a speed resolver operative to produce pulses whose frequency varies with the vehicle speed;

a fixed frequency pulse generator;

and a binary counter operatively coupled to said speed resolver and said fixed frequency pulse generator to count the pulses from said speed resolver between successive pulses from said fixed frequency pulse generator;

said binary counter having first, second and third output terminals at successively higher binary levels which provide corresponding speed resolver pulse counts;

and further comprising:

a first flip-flop operatively connected to said first output terminal of the counter to respond to an output pulse produced thereat when the vehicle speed is below the upper limit of said predetermined speed range;

a second flip-flop operatively connected to said second output terminal of the counter to respond to an output pulse produced thereat when the vehicle speed is below said intermediate speed;

a third flip-flop operatively connected to said third output terminal of the counter to respond to an output pulse produced thereat when the vehicle speed is below the lower limit of said predetermined speed range;

and means operable in response to each pulse from said speed resolver to restore each of said flip-flops to its condition prior to the output pulse at the corresponding output terminal of the counter.

10. A brake control apparatus according to claim 9, and further comprising:

a NOR gate having two inputs connected respectively to the outputs of said first and third flip-flops and a third input operatively connected to receive inverted pulses from said speed resolver;

a fourth flip-flop operatively coupled to the accelerator pedal and to the output of said NOR gate to be set when the vehicle speed is within said predetermined speed range and the accelerator pedal is released;

and a NAND gate having a first input connected to the output of said fourth flip-flop, a second input operatively connected to the output of said second flip-flop, and a third input operatively connected to the accelerator pedal (a) to produce an output signal effective to de-energize said electrical control means whenever the vehicle speed is above said preselected intermediate speed or the accelerator pedal is depressed, and (b) to produce an output signal effective to energize said electrical control means when the accelerator pedal is released and the vehicle speed is below said intermediate speed after being within said predetermined speed range.

11. A brake control apparatus according to claim 10, and further comprising:

a switch operated by said accelerator pedal and operatively coupled to said fourth flip-flop to reset the latter when the accelerator pedal is depressed and the vehicle speed is above said preselected intermediate value, said switch also being operatively connected to said third input of said NAND gate to determine the polarity of the signal on said third input.

12. A brake control apparatus according to claim 11, wherein:

said switch is closed when the accelerator pedal is released and is opened when the accelerator pedal is depressed;

and further comprising:

a voltage source connected to one terminal of said switch;

first resistance means connected between the opposite terminal of said switch and both said fourth flip-flop and said third input of said NAND gate;

and second resistance means connected between the opposite terminal of said switch and ground.

13. A brake control apparatus according to claim 12, and further comprising:

a manually-operated, normally-open switch connected in parallel with said second resistance means and operable when closed to prevent the energization of said electrical control means.

14. A brake control apparatus according to claim 10, and further comprising:

binary logic circuit means having a plurality of inputs and having an output operatively connected to control the resetting of said fourth flip-flop depending upon the polarity of the signals at its inputs.

15. A brake control apparatus according to claim 14, and further comprising:

an anti-theft circuit, including a manually insertable key, operatively connected to one of said inputs of said binary logic circuit means to prevent the resetting of said fourth flip-flop when an incorrect key is in said anti-theft circuit and enable the resetting of said fourth flip-flop when a correct key is in said anti-theft circuit.

16. A brake control apparatus according to claim 14, and further comprising:

a switch operated by said accelerator pedal and operatively connected to one of said inputs of said binary logic circuit means to control the resetting of said fourth flip-flop.

17. A brake control apparatus according to claim 14, and further comprising:

circuit means operatively connecting the output of said second flip-flop to one of said inputs of said binary logic circuit means to control the resetting of said fourth flip-flop in accordance with the output from said second flip-flop.

18. A brake control apparatus according to claim 17, and further comprising:

a switch operated by said accelerator pedal and operatively connected to a second input of said binary logic circuit means to control the resetting of said fourth flip-flop jointly with the output from said second flip-flop.

19. A brake control apparatus according to claim 18, and further comprising:

an anti-theft circuit, including a manually insertable key, operatively connected to a third input of said binary logic circuit means to prevent the resetting of said fourth flip-flop when an incorrect key is in said anti-theft circuit irrespective of the signals at said first and second inputs and to enable the resetting of said fourth flip-flop by the signals at said first and second inputs when a correct key is in said anti-theft circuit.

20. A brake control apparatus according to claim 10, and further comprising:

a second NAND gate having a first input connected to a voltage source and a second input operatively connected to the output of said second flip-flop to receive a signal of the same polarity as said voltage source when the vehicle speed is below said preselected intermediate value;

a third NAND gate having a first input connected to a voltage source, a second input connected to the output of said first-mentioned NAND gate, and a third input connected to the output of said second NAND gate;

and means operatively coupling the output of said third NAND gate to said electrical control means to maintain the latter de-energized whenever the vehicle speed is above said preselected intermediate value of said speed resolver fails or the accelerator pedal is depressed.

21. A brake control apparatus according to claim 20, and further comprising:

an anti-theft circuit, including a manually insertable key, operatively connected to a third input of said second NAND gate to maintain said electrical control means energized when an incorrect key is in said anti-theft circuit and the vehicle is stopped.

22. In a brake control apparatus on a motor vehicle having an accelerator pedal, fluid pressure-operated brakes, valve means controlling the release of fluid pressure from the brakes, and electrically operated control means for causing said valve means to hold fluid pressure applied to the brakes after the vehicle is brought to a stop, the improvement which comprises:

a speed resolver for sensing the vehicle speed, said speed resolver being operatively coupled to said control means to cause the latter to hold fluid pressure applied to the brakes when the vehicle speed is below a preselected speed and the accelerator pedal is released;

and means responsive to a failure of said speed resolver for disabling said valve means from holding fluid pressure applied to the brakes.

23. A brake control apparatus according to claim 22, wherein said speed resolver produces pulses whose frequency varies with the vehicle speed;

said control means includes electrically enerziable means which, when energized, operates said valve means to hold fluid pressure applied to the brakes;

and said means responsive to a failure of said speed resolver includes a circuit operatively connected between the output of said speed resolver and said electrically energizable means to de-energize the latter upon a cessation of pulses from said speed resolver.

24. In a brake control apparatus on a motor vehicle having an accelerator pedal, fluid pressure-operated brakes, valve means controlling the release of fluid pressure from the brakes, and electrical control means for causing said valve means to hold fluid pressure applied to the brakes, the improvement which comprises:

a speed resolver for producing signals in accordance with the vehicle speed;

a binary logic circuit device having first, second and third input terminals;

circuit means operatively connected between said speed resolver and said first input terminal to apply a binary signal to the latter which depends upon whether the vehicle speed is within a predetermined range;

circuit means operatively connected between said speed resolver and said second input terminal to apply a binary signal to the latter which depends upon whether the vehicle speed is below or above a preselected speed within said speed range;

a switch operated by said accelerator pedal and operatively connected to said third input terminal to apply a binary signal to the latter which depends upon whether the accelerator pedal is depressed or released;

and circuit means operatively connecting the output of said binary logic circuit device to said electrical control means for controlling the latter's operation to cause said valve means to hold fluid pressure applied to the brakes when the vehicle speed is within said range and below said preselected speed and the accelerator pedal is released.

25. In a brake control apparatus on a motor vehicle having an accelerator pedal, fluid pressure-operated brakes, valve means controlling the release of fluid pressure from the brakes, and electrical control means for causing said valve means to hold fluid pressure applied to the brakes, the improvement which comprises:

a speed resolver for producing signals in accordance with the vehicle speed;

a binary logic circuit device having first, second and third input terminals;

circuit means operatively connected between said speed resolver and said first input terminal to apply a binary signal to the latter which depends upon whether the vehicle speed is within a predetermined range;

circuit means operatively connected between said speed resolver and said second input terminal to apply a binary signal to the latter which depends upon whether the vehicle speed is below or above a preselected speed within said speed range;

a switch operated by said accelerator pedal and operatively connected to said third input terminal to apply a binary signal to the latter which depends upon whether the accelerator pedal is depressed or released;

circuit means operatively connecting the output of said binary logic circuit device to said electrical control means for controlling the latter's operation to cause said valve means to hold fluid pressure applied to the brakes when the vehicle speed is within said range and below said preselected speed and the accelerator pedal is released;

and an anti-theft circuit which produces a predetermined binary signal until operated in a predetermined manner and produces the opposite binary signal after being operated in said predetermined manner;

said circuit means operatively connecting the output of said binary logic circuit device to said electrical control means comprising:

an additional binary logic circuit device having a first input terminal operatively connected to receive the output signal from said first-mentioned binary logic circuit device and having a second input terminal operatively connected to said anti-theft circuit to respond to the binary signal produced by said anti-theft circuit.

26. A brake control apparatus according to claim 25, and further comprising:

a third binary logic circuit device having a first input terminal connected to said second input terminal of said first-mentioned binary logic circuit device to receive the binary signal which depends upon whether the vehicle speed is below or above said preselected speed within said predetermined speed range, said third binary logic circuit device having a second input terminal connected to said anti-theft circuit to receive the binary signal produced by said anti-theft circuit, and said third binary logic circuit device having an output terminal connected to said second input terminal of said second binary logic circuit device.

27. In a brake control apparatus on a motor vehicle having an accelerator pedal, fluid pressure-operated brakes, valve means controlling the release of fluid pressure from the brakes, and electrical control means for causing said valve means to hold fluid pressure applied to the brakes, the improvement which comprises:

a speed resolver for producing signals in accordance with the vehicle speed;

a binary logic circuit device having first, second and third input terminals;

circuit means operatively connected between said speed resolver and said first input terminal to apply a binary signal to the latter which depends upon whether the vehicle speed is within a predetermined range;

circuit means operatively connected between said speed resolver and said second input terminal to apply a binary signal to the latter which depends upon whether the vehicle speed is below or above a preselected speed within said speed range;

a switch operated by said accelerator pedal and operatively connected to said third input terminal to apply a binary signal to the latter which depends upon whether the accelerator pedal is depressed or released;

circuit means operatively connecting the output of said binary logic circuit device to said electrical control means for controlling the latter's operation to cause said valve means to hold fluid pressure applied to the brakes when the vehicle speed is within said range and below said preselected speed and the accelerator pedal is released;

said circuit means operatively connected between said speed resolver and said first input terminal of said binary logic circuit device including a flip-flop operative to produce a binary output signal when the vehicle speed is within said predetermined range;

an anti-theft circuit which produces a predetermined binary signal until operated in a predetermined manner and produces the opposite binary signal after being operated in said predetermined manner;

and a binary logic circuit device having a first input terminal operatively connected to said switch operated by the accelerator pedal, a second input terminal operatively connected to said anti-theft circuit to receive the binary signal produced by said anti-theft circuit, and a third input terminal operatively connected to receive said binary signal which depends upon whether the vehicle speed is below or above said preselected speed, said device having an output terminal operatively connected to said flip-flop to cause the latter to produce the opposite binary output signal after the anti-theft circuit is operated in said predetermined manner and the accelerator pedal is depressed and the vehicle speed exceeds said preselected speed.

28. A brake control apparatus according to claim 27, wherein said opposite binary output signal from said flip-flop causes valve means to release the fluid pressure applied to the brakes.

29. In a brake control apparatus on a motor vehicle having an accelerator pedal, fluid pressure-operated brakes, valve means controlling the release of fluid pressure from the brakes, and electrical control means for causing said valve means to hold fluid pressure applied to the brakes, the improvement which comprises:

a speed resolver for producing signals in accordance with the vehicle speed;

a binary logic circuit device having first, second and third input terminals;

circuit means operatively connected between said speed resolver and said first input terminal to apply a binary signal to the latter which depends upon whether the vehicle speed is within a predetermined range;

circuit means operatively connected between said speed resolver and said second input terminal to apply a binary signal to the latter which depends upon whether the vehicle speed is below or above a preselected speed within said speed range;

a switch operated by said accelerator pedal and operatively connected to said third input terminal to apply a binary signal to the latter which depends upon whether the accelerator pedal is depressed or released;

circuit means operatively connecting the output of said binary logic circuit device to said electrical control means for controlling the latter's operation to cause said valve means to hold fluid pressure applied to the brakes when the vehicle speed is within said range and below said preselected speed and the accelerator pedal is released;

said circuit means operatively connected between said speed resolver and said first input terminal of said binary logic circuit device including a flip-flop operative to produce a predetermined binary output signal when the vehicle speed is within said predetermined range;

said binary logic circuit device being a first NAND gate;

an anti-theft circuit which produces a predetermined binary signal until operated in a predetermined manner and produces the opposite binary signal after being operated in said predetermined manner;

a NOR gate having a first input terminal operatively connected to said switch operated by the accelerator pedal, a second input terminal operatively connected to said anti-theft circuit to receive the binary signal produced by said anti-theft circuit, and a third input terminal operatively connected to receive said binary signal which depends upon whether the vehicle speed is below or above said preselected speed, said NOR gate having an output terminal operatively connected to said flip-flop to cause the latter to produce the opposite binary output signal after the anti-theft circuit is operated in said predetermined manner and the accelerator pedal is depressed and the vehicle speed exceeds said preselected speed;

and said circuit means operatively connecting the output of said binary logic circuit device to said electrical control means comprising:

a second NAND gate having a first input terminal operatively connected to receive the output signal from said first NAND gate and having a second input terminal;

and a third NAND gate having a first input terminal connected to said second input terminal of said first NAND gate to receive the binary signal which depends upon whether the vehicle speed is below or above said preselected speed within said predetermined speed range, said third NAND gate having a second input terminal connected to said anti-theft circuit to receive the binary signal produced by said anti-theft circuit, and said third NAND gate having an output terminal connected to said second input terminal of said second NAND gate to put the operation of said second NAND gate under the control of said anti-theft circuit.

* * * * *